June 19, 1962   H. A. SPIVEY   3,039,502
PORTABLE CHAIN SAW MORTISING GAGE
Filed Jan. 6, 1959   2 Sheets-Sheet 1

INVENTOR.
HOKE A. SPIVEY
BY
ATTORNEY

June 19, 1962 H. A. SPIVEY 3,039,502
PORTABLE CHAIN SAW MORTISING GAGE
Filed Jan. 6, 1959 2 Sheets-Sheet 2

INVENTOR.
HOKE A. SPIVEY
BY James D. Wolfe
ATTORNEY

United States Patent Office 3,039,502
Patented June 19, 1962

3,039,502
PORTABLE CHAIN SAW MORTISING GAGE
Hoke A. Spivey, 7912 N. May Ave.,
Oklahoma City, Okla.
Filed Jan. 6, 1959, Ser. No. 785,217
1 Claim. (Cl. 144—73)

This invention relates to a novel portable chain saw. More particularly, this invention relates to a novel portable chain saw having a novel endless chain saw blade capable of cutting on the round or end part to cut a square hole in a piece of wood.

Although power chain saws are well known and widely used in the lumbering industry, it is well known that these saws are very hazardous. It is a known fact that a break in the endless chain of a power saw frequently results in serious injury to the operator since the chain is free to pivot outward from the cutter bar in a manner analogous to the way a whip acts when cracked.

A still further disadvantage of the prior art chain saws is the inability of the saw to operate smoothly, i.e. without bouncing, when the end or round part of the chain saw contacts a flat surface as when attempting to cut a square hole. Not only does the prior art saws bounce when using the end or round part for cutting but the hazards associated with its use are increased several fold when compared with the hazards experienced with the use of the straight part for cutting.

It is a principal object of this invention to provide a novel portable chain saw having enhanced safety features even when using the round part of the chain saw for cutting since the chain is pivotable outward from the cutter bar to a limited extent only.

A further object of this invention is to provide one of the many needed or useful inventions listed by the Inventor's Council, namely, a power device for making square holes in wood of a size in excess of one inch or more.

Another object of this invention is to provide an endless chain type saw which cuts as well on the round or end section as on the straight section of the saw.

Still other objects of this invention will be apparent from a study of the following specifications, read in connection with the accompanying drawings, wherein.

Figure 2:
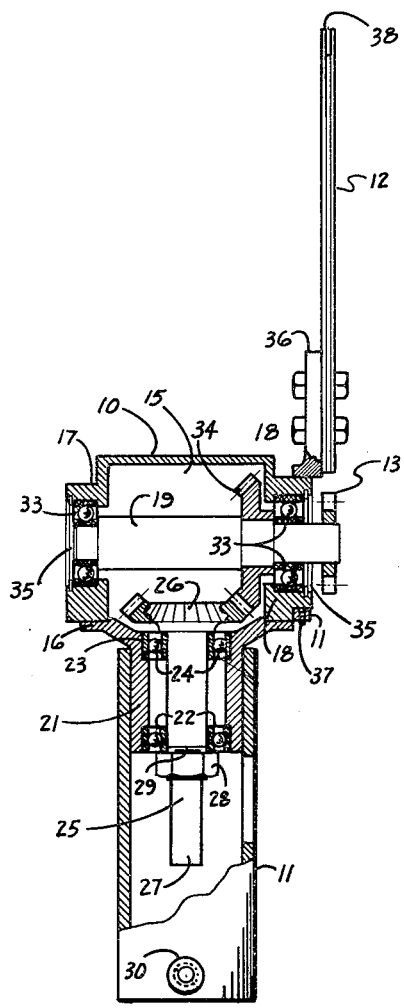
FIGURE 2 is a plan view of the saw of FIGURE 1 without the endless chain and with some parts broken away.
Figure 1:
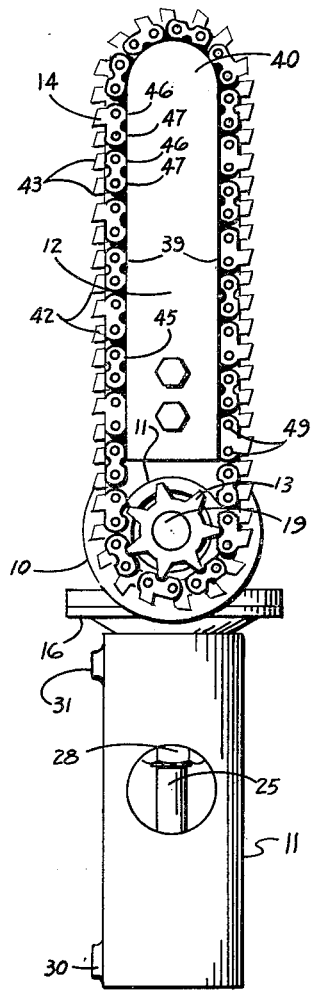
FIGURE 1 is a side elevational view of the chain saw showing the sleeve means for coupling the saw to a prime mover (not shown) such as an electric drill.
Figure 3:
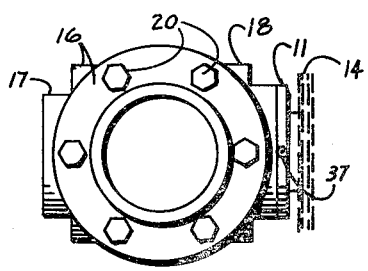
FIGURE 3 is an end elevational view of FIGURE 2.

The portable chain saw as shown in FIGURES 1 and 2 comprises a housing 10, a connecting sleeve 11, a cutter bar 12 and a sprocket 13, and an endless chain 14.

The housing comprises a body part 15 having a face plate 16 bolted thereto and having a pair of opposed shoulders 17 and 18 to receive the driven shaft 19 in rotatable relationship therein. Face plate 16 has bolt holes 20 and a hub 21 positioned centrally therein. The hub has ball bearing races 22 and 23 to receive the ball bearings 24 which act as bearing surfaces for drive shaft 25.

Drive shaft 25 is a short stub shaft having a bevel gear 26 on the end extending inside the body of the housing. The other end 27 of the drive shaft extends through hub 21 and has a packing nut 28 thereon. The packing nut serves to tighten the packing 29 between the hub and the shaft to form a lubricant seal.

End 27 of the drive shaft which extends beyond the hub may be connected to a prime mover (not shown) such as a small portable electric drill by means of a suitable chuck or other means. Then the electric drill can supply the power for operating the saw.

Rotation of the drive shaft by a suitable source of power will rotate the saw unless the electric motor, for instance, and the saw are secured against rotation. The elongated connecting sleeve 11 is used to accomplish this objective. The elongated sleeve 11 is slipped over the shaft of the electric drill and secured to the shank of the drill housing (not shown) by means of set screw 30. The other end of the sleeve slips over the hub and is retained in this position by tightening set screw 31. Hence, the elongated sleeve serves to secure the motor to the saw but still allows the rotation of the drive shaft of the saw to affect movement of the endless chain.

Driven shaft 19 journalled in said pair of opposed shoulders 17 and 18 rests on the bearing surfaces formed by the ball bearings 32 within the shoulder races 33. A bevel gear 34 is positioned on the driven shaft within the housing adjacent shoulder 18 and in operative contact with bevel gear 26 of the drive shaft.

Lubricant seals 35 are positioned around the driven shaft to retain the lubricant within the housing and thus permit the gear and bearings to be bathed in lubricant.

Driven shaft 19 extends through shoulder 18 of the housing and has a sprocket 13 located thereon in close proximity to the lubricant seal 35.

The cutter bar 12 extends outward radially relative to the driven shaft in substantially the same plane as the sprocket and the ring arm 36 secures the cutter bar to shoulder 18. Ring arm 36 fits over shoulder 18 and may be rotated about said shoulder after loosening retaining screws 37. Since ring arm 36 is bolted or welded to the cutter bar, rotation of ring arm 36 about the shoulder allows the cutter bar to be positioned at any angle relative to the plane of the drive shaft.

This ability to set the cutter bar at any angle permits a workman to use the saw to make cuts with minimum strain and effort. Sometimes this arrangement eliminates the need for special scaffolding as well as permits the saw to be used in very close or tight quarters where commercial saws could not be used.

The cutter bar has a longitudinal groove 38 extending around its periphery on the straight sides 39 and the rounded end part or section 40. This groove and its position on the cutter bar is shown best in FIGURES 2 and 6.

The endless chain saw blade 14 extends around the sprocket and the cutter bar, i.e. the two straight sections and the end section, as shown in FIGURE 1. Rotation of the sprocket causes the chain to travel circuitously around the sprocket and cutter bar in the direction of sprocket rotation. As the chain rotates at high speeds, it tends to crawl off the cutter bar except that the groove members 41 of the drag links 42 in the chain extend down inside groove 38 and thus prevent said movement.

Figure 5:
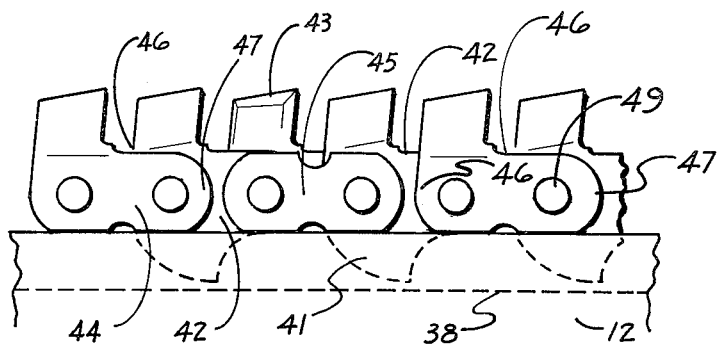
FIGURE 5 is an enlarged fragmentary view in elevation of the chain and the cutter bar.

Reference to FIGURE 5 shows that drag links 42 form the center part of the endless chain saw blade and how the groove members 41 fit inside of groove 38 of the cutter bar. Also, this view of the chain clearly shows the chain to have a triple thickness consisting of a cutter link 44, a drag link 42 and a plate link 45 with the next successive link in the chain consisting of a plate link, a drag link and a cutter link.

Figure 4:
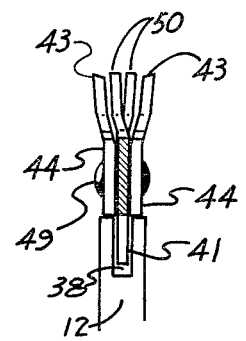
FIGURE 4 is a cross-sectional view through FIGURE 5.

Reference to FIGURES 1 and 4 shows a series of in line drag links pivotally connected to each other in a heel 46 to toe 47 relationship by means of a cutter link on one side and a plate link on the other side. A plate link is positioned between each pair of in line cutter links since the cutter links alternate from one side of the drag link to the other side of the next successive drag link. Hence, the endless chain saw blade comprises a series in inline but closely spaced apart drag links having cutter links and plate links respectively positioned on opposite sides of each drag link to connect pivotally the toe of one drag link to the heel of the next successive drag link with each successive cutter link and plate link respectively alternating from one side of the drag link to the other side of the next successively drag link to give two rows of cutter links with a plate link between each pair of cutter links.

Each link, i.e. cutter, drag or plate, has a heel and toe position with a hole 48 in each position to permit the chain to be fabricated in the above heel to toe arrangement by means of link pins or brads 49.

The drag and cutter links have the general appearance of a shoe when viewed from the side. The upward projecting part of the drag and cutter links corresponding to the top of the shoe depends rearward to give the appearance shown best in FIGURE 4, and thereby forms the upward projecting drag member 50 and cutter tooth 43, respectively.

The upward projecting part of the cutter and drag links are given the set best seen in FIGURE 5 to control the kerf cut by the saw. This set causes the top of the saw, i.e. the tooth part to project outward more than the bottom of the chain that slides on the cutter bar.

From a study of the chain shown in FIGURE 5 it is obvious that the length of the links should be substantially proportional to the height of the teeth or drag member, and the spacing between each drag link is relatively close. The spacing should be far enough apart to permit the chain to make the circular turn around the end section and the sprocket. Also, the size of the circle of the end section tends to limit the length of the link which may be used.

The spacing between each drag link should be close enough to prevent the chain from pivoting outward sufficiently to snap backward and hit the saw operator. This desirable effect is obtained by spacing the drag links 42 close enough together to allow the toe 47 of the preceding drag link to contact the heel 46 of the succeeding drag link on outward movement relative to the cutter bar as shown in FIGURE 5 wherein the broken link 42 is shown in an alternate position by the broken outline 42' with the heel 46' in contact with the toe 47 of the preceding drag link and with the groove member 41' still within the groove 38, and thereby limit said outward movement of the broken chain.

Figure 6:
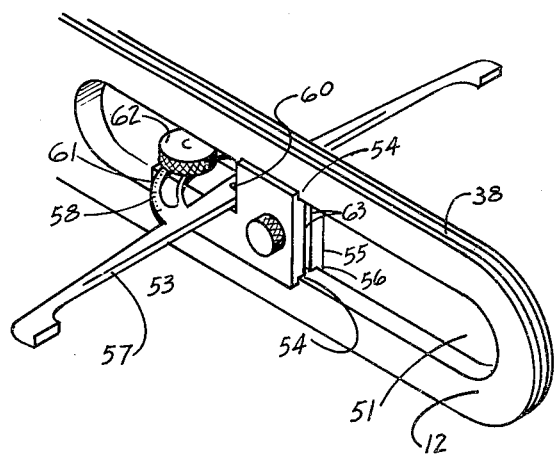
FIGURE 6 is a perspective view of a special cutter bar fitted with an angle gauge.

FIGURE 6 shows a special embodiment of the cutter bar having an elongated opening 51 longitudinally thereof. An angle gauge 52 is also shown fastened in opening 51. This angle gauge comprises an L-shaped member 53 having a pair of notches 54 along its opposed edges, a flat member 55 having a pair of notches 56 corresponding to the notches 54 of the L-shaped member, and a gauge member 57 having a protractor 58 located substantially centrally of said gauge member. The gauge member is pivotally secured to the L-shaped member by a pin 60 in the manner shown in FIGURE 6.

The L-shaped member is placed against the side of the cutter bar with the non-recessed part 63 fitting within the opening 51 in a slideable manner; then the flat member 55 is positioned on the opposite side of the cutter bar in the manner shown in FIGURE 6. With the L-shaped member and the flat member positioned as described above, bolt 59 is used to fasten the two members together.

With the angle gauge assembled in the manner shown in FIGURE 6, the gauge member may be pivoted about protractor pin 60 until the desired angle 61 shown on the protractor is obtained; then the protractor is locked at this angle by tightening protractor screw 62. With the angle gauge set at the desired angle, the gauge member may be used to guide the saw in making a cut at the desired angle.

An endless chain saw of the type described herein can easily cut a square hole through the center of a railroad cross-tie by proper manipulation of the saw to make four successive cuts at right angles to each other.

What is claimed is:

An angle gauge for an endless chain saw having an elongated opening therein and having a groove extending around the periphery of the cutter bar, which comprises a member having means for retaining said member within the opening of the cutter bar but allowing the member to slide longitudinally within the opening in response to pressure on a guide arm, the guide arm being attached pivotally to said member and being adjustable and lockable in a predetermined angular relationship with the longitudinal axis of the cutter bar, a means for locking the guide arm at any angle indicated by a protractor associated with said member and lying in a plane at right angles to said cutter bar.

References Cited in the file of this patent

UNITED STATES PATENTS

| | | |
|---|---|---|
| 427,818 | Young | May 13, 1890 |
| 1,637,464 | Bianca | Aug. 2, 1927 |
| 1,690,697 | Palmu | Nov. 6, 1928 |
| 1,785,065 | Aborn | Dec. 16, 1930 |
| 1,892,246 | Mohns | Dec. 27, 1932 |
| 2,348,612 | Deacon | May 9, 1944 |
| 2,356,437 | Smith | Aug. 22, 1944 |
| 2,485,962 | Entwisle | Oct. 25, 1949 |
| 2,637,357 | Johnson et al. | May 5, 1953 |
| 2,749,950 | Jamieson et al. | June 12, 1956 |